(12) United States Patent
Wang et al.

(10) Patent No.: US 7,974,403 B2
(45) Date of Patent: Jul. 5, 2011

(54) METHOD AND SYSTEM FOR CALLED PARTY TO PROVIDE INDICATION INFORMATION TO CALLING PARTY

(75) Inventors: Jun Wang, Shenzhen (CN); Yan Li, Shenzhen (CN); Yi Zhang, Shenzhen (CN); Jianfeng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1294 days.

(21) Appl. No.: 11/505,108

(22) Filed: Aug. 15, 2006

(65) Prior Publication Data

US 2007/0121916 A1 May 31, 2007

(30) Foreign Application Priority Data

Aug. 15, 2005 (CN) .......................... 2005 1 0092433

(51) Int. Cl.
*H04M 1/00* (2006.01)
(52) U.S. Cl. ................. 379/373.01; 379/93.01
(58) Field of Classification Search .................. 379/164, 379/179, 207.08, 207.16, 211.03, 252, 373, 379/183, 67.1, 373.01–375.01, 73.03; 455/401, 455/567
See application file for complete search history.

(56) References Cited

U.S. PATENT DOCUMENTS

| | | | | |
|---|---|---|---|---|
| 4,811,382 A * | 3/1989 | Sleevi | ........................... | 379/67.1 |
| 6,977,993 B2 * | 12/2005 | Starbuck et al. | ........... | 379/88.21 |
| 2004/0062374 A1 * | 4/2004 | Lund | ........................ | 379/218.01 |
| 2004/0102163 A1 | 5/2004 | Seki | | |
| 2004/0114732 A1 * | 6/2004 | Choe et al. | .................. | 379/88.17 |
| 2005/0078812 A1 * | 4/2005 | Batni et al. | ............... | 379/207.16 |
| 2005/0094796 A1 * | 5/2005 | Beauford | ................. | 379/211.01 |
| 2006/0023862 A1 * | 2/2006 | Sutcliffe | ........................ | 379/257 |
| 2006/0026277 A1 * | 2/2006 | Sutcliffe | ........................ | 709/224 |
| 2006/0245571 A1 * | 11/2006 | Radziewicz et al. | ...... | 379/220.01 |

FOREIGN PATENT DOCUMENTS

| | | |
|---|---|---|
| CN | 1488229 A | 4/2004 |
| CN | 1488229 A | 4/2004 |
| CN | 1520211 A | 8/2004 |
| CN | 1543231 A | 11/2004 |
| CN | 1556643 | 12/2004 |
| JP | 09162978 A | 6/1997 |

(Continued)

OTHER PUBLICATIONS

Supplementary European Search Report issued on Jun. 17, 2009 in connection with European Patent Application No. 06 75 3051.

(Continued)

*Primary Examiner* — Simon Sing
*Assistant Examiner* — Akelaw A Teshale

(57) ABSTRACT

The present invention discloses a method for a called party to provide indication information for a calling party. The method includes the steps of: presetting the indication information to be provided to the calling party at the called party; before the called party answers the call in the connection procedure between the calling party and the called party, the network side obtaining the preset indication information from the called party and sending the indication information to the calling party. Accordingly, the present invention discloses a system for a called party to provide the indication information to a calling party. The present invention makes it possible that the called party flexibly selects the indication information to be provided to the calling party and the problem that only the indication information in the indication information database can be provided is avoided.

9 Claims, 15 Drawing Sheets

FOREIGN PATENT DOCUMENTS

| | | |
|---|---|---|
| JP | 3567143 | 6/2004 |
| JP | 2005-80154 | 3/2005 |
| JP | 3819232 | 6/2006 |
| KR | 10-2004-0034865 | 4/2004 |
| KR | 10-2005-0002267 | 1/2005 |
| KR | 10-2005-0036355 | 4/2005 |
| WO | WO 99/00751 | 1/1999 |
| WO | WO 03/009632 A1 | 1/2003 |
| WO | WO 2005/009015 A1 | 4/2004 |
| WO | 2004/054282 A2 | 6/2004 |
| WO | 2004/095817 A1 | 11/2004 |
| WO | 2004/107722 | 12/2004 |

OTHER PUBLICATIONS

Notice of Office Action (with English translation) issued by the Korean Intellectual Property Office on Oct. 15, 2009 in connection with Korean Application No. 10-2008-7005332.

Notice of Office Action (with English translation) issued by the Korean Intellectual Property Office on Apr. 14, 2010 in connection with Korean Application No. 10-2008-7005332.

Office Action dated Apr. 12, 2011 in connection with Japanese Patent Application No. 2008-526355.

Communication pursuant to Article 94(3) EPC dated Apr. 1, 2011 in connection with European Patent Application No. 06 753 051.9.

* cited by examiner

METHOD AND SYSTEM FOR CALLED PARTY TO PROVIDE INDICATION INFORMATION TO CALLING PARTY

FIELD OF THE INVENTION

The present invention relates to the communication field, and more particularly, to a method and system for a called party to provide the indication information to a calling party.

BACKGROUND

With the ring back tone service, the user can subscribe the ring back tone for himself, i.e. when the calling party dials the called party, after the ringing and before the called party picks up the phone, the calling party will hear the ring back tone subscribed by the calling party, the called party or the group user. If the ring back tone is subscribed by the calling party, it is the calling party ring back tone; if the ring back tone is subscribed by the called party, it is the called party ring back tone; and if the ring back tone is subscribed by the group user, it is the group user ring back tone. The ring back tone service makes the network ability of the operator available to the end user and provides service support for the user to show his individuality. This service meets the strong requirement of the modern people to show individualities and therefore has obtained a good market feedback.

As one of the voice indications, the ring back tone can only provide the user with the preset indication, which is stored in the operator's server. In addition, no matter the ring back tone in the form of the audio or in the form of the video, they are both transmitted in the call media channel; however, if the calling party uses a multi-path terminal such as a phone supporting the SMS or an intelligent phone supporting the GPRS or the Wi-Fi or an intelligent terminal or a set-top box connected with the broadband network, these terminals can support the information indication in the non-call media channel.

Currently, the ring back tone service is mainly realized in the following ways:

1. Fixed Network Ring Back Tone Realization Solution Based on the PSTN

Generally, the PSTN network can use the called party office to trigger the ring back tone service. The principle is that the called party office records the ring back tone registration information of the user and determines the ring back tone registration information when a call arrives so that when the called party has registered for the ring back tone and the status allows, the call is routed to the ring back tone service platform to be processed and the called party office has the ability to prevent the ring back tone service from being triggered twice. The realization of the fixed network ring back tone based on the PSTN is shown in FIG. 1.

2. Mobile Network Ring Back Tone Realization Solution Based on the GSM

The GSM network also uses the called party office to trigger the ring back tone service. The principle is that the called party office records the ring back tone registration information of the user and determines the ring back tone registration information when a call arrives so that when the called party has registered for the ring back tone and the status allows, the call is routed to the ring back tone service platform to be processed.

Generally the mode without channel alternate is adopted, i.e. the ring back tone service platform plays the subscribed ring back tone according to the call information and the called party bridges the calling party, called party and the ring back tone service platform so that when the called party rings the calling party will hear the ring back tone; after the called party answers the phone, the calling party and the called party begin to communicate and the ring back tone path will be released. The realization of the mobile network ring back tone based on the GSM is shown in FIG. 2.

The characteristics of the GSM mobile network can solve the problem when the user of the ring back tone service roams.

3. Packet Network Multimedia Ring Back Tone Realization Solution Based on the NGN/3G Generally, the NGN/3G network uses the soft switch office to trigger the ring back tone service. The principle is: the called party office records the ring back tone registration information of the user and determines the ring back tone registration information when a call arrives, so that when the called party has registered for the ring back tone and the status allows, the call is routed to the multimedia ring back tone service platform to be processed. Generally the application server is responsible for the connection and disconnection between the calling party, the called party and the multimedia ring back tone service platform. The realization of the packet network multimedia ring back tone based on the NGN/3G is shown in FIG. 3.

SUMMARY OF THE INVENTION

The embodiment of the present invention discloses a method for providing the indication information from the called party to the calling party, includes:

presetting the indication information to be provided to the calling party at the called party;

before the called party answers the call in the connection procedure between the calling party and the called party, the network side obtaining the preset indication information from the called party and sending the indication information to the calling party.

The embodiment of the present invention further discloses a system for providing the indication information from the called party to a calling party, by which the called party provides the indication information to the calling party through the network side, wherein:

the called party includes an indication information setting unit for setting the indication information to be provided to the calling party;

the network side includes an obtaining and sending unit for obtaining the set indication information from the indication information setting unit at the called party before the called party answers the call in the connection procedure between the calling party and the called party, and for sending the indication information to the calling party.

The embodiment of the present invention further discloses a method for a called party to provide the indication information to a calling party, including:

setting the address of the indication information to be provided to the calling party at the called party;

before the called party answers the call in the connection procedure between the calling party and the called party, the network side obtaining the address of the preset indication information from the called party; and acquiring the corresponding indication information from the corresponding media source according to the obtained address of the indication information and sending the indication information to the calling party.

The embodiment of the present invention further discloses a system for providing the indication information to a calling party, by which the called party provides the indication information to the calling party through the network side, wherein the called party includes:

an indication information address setting unit for setting the address of the indication information to be provided to the calling party;

the network side includes:

an indication information address obtaining unit for obtaining the address of the preset indication information from the indication information address unit at the called party before the called party answers the call in the connection procedure between the calling party and the called party;

an acquiring and sending unit for acquiring the corresponding indication information from the corresponding media source according to the address of the indication information obtained by the indication information address obtaining unit and sending the indication information to the calling party.

The embodiment of the present invention further discloses a communication device for providing indication information, which includes:

an indication information setting unit configures to set indication information to be provided to a user terminal calling the communication device, wherein the communication device provides the indication information set in the indication information setting unit to the user terminal before the communication device answers the call in the connection procedure between the communication device and the user terminal when receiving the request for obtaining the indication information.

The embodiment of the present invention further discloses a communication device for providing indication information, which includes:

a setting unit configures to set information for obtaining indication information to be provided to a user terminal calling the communication device, wherein the communication device provides the information for obtaining indication information set in the setting unit to an obtaining device before the communication device answers the call in the connection procedure between the communication device and the user terminal when receiving the request for obtaining the indication information, the obtaining device obtainins the indication information according to the request for obtaining indcation information received from the communication device and send the obtained indication information to the user terminal.

BRIEF DESCRIPTION OF THE DRAWINGS

The accompanying drawings, which are incorporated in and constitute a part of this specification, illustrate the invention and together with the description, serve to explain the principles of the invention.

In the drawings.

DETAILED DESCRIPTION OF THE INVENTION

Figure 1:
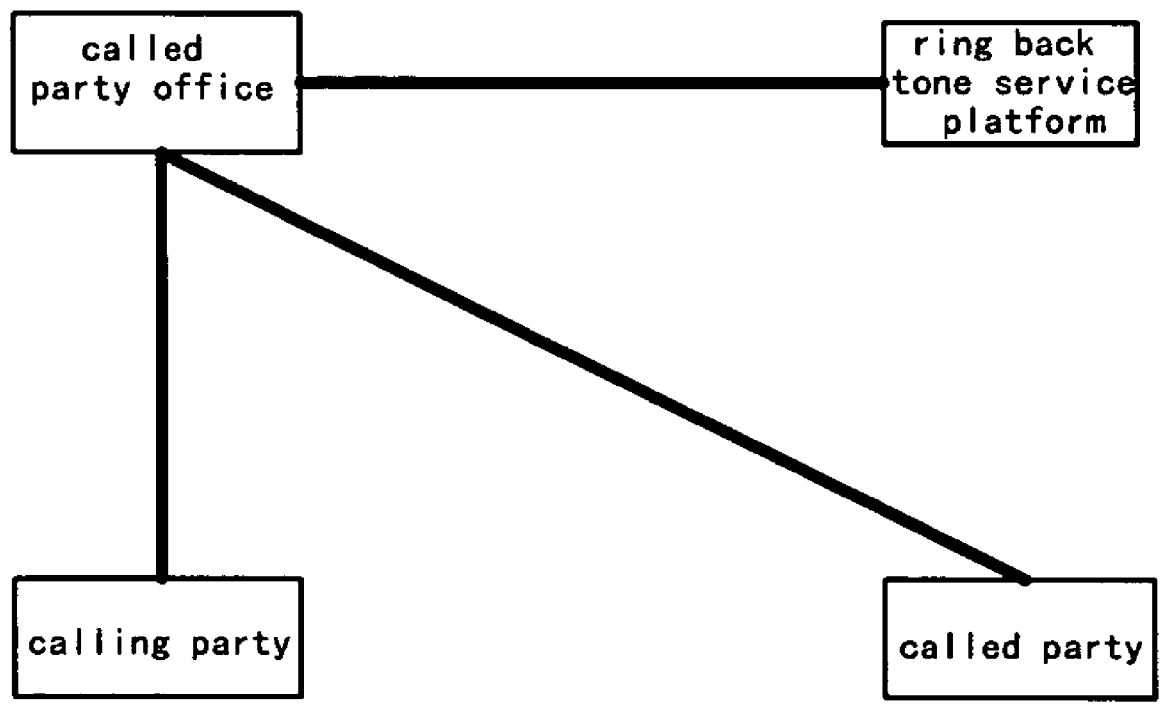
FIG. 1 is a schematic diagram showing the realization of the fixed network ring back tone based on the PSTN.
Figure 2:
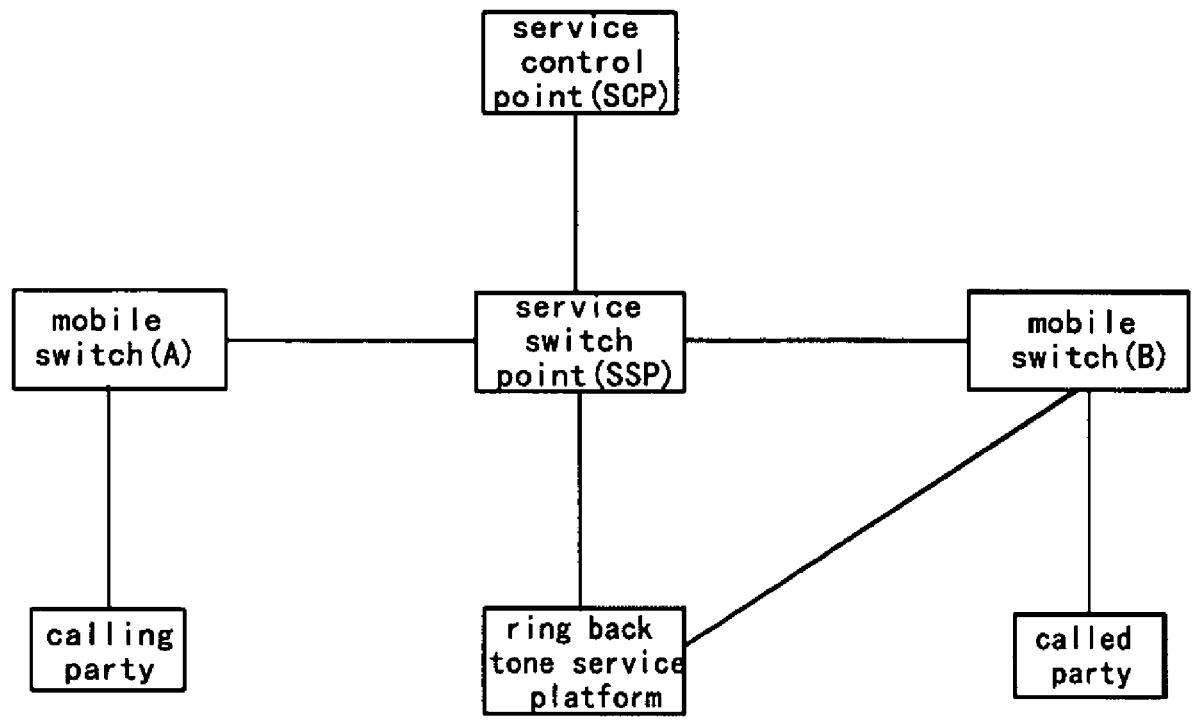
FIG. 2 is a schematic diagram showing the realization of the mobile network ring back tone based on the GSM.
Figure 3:
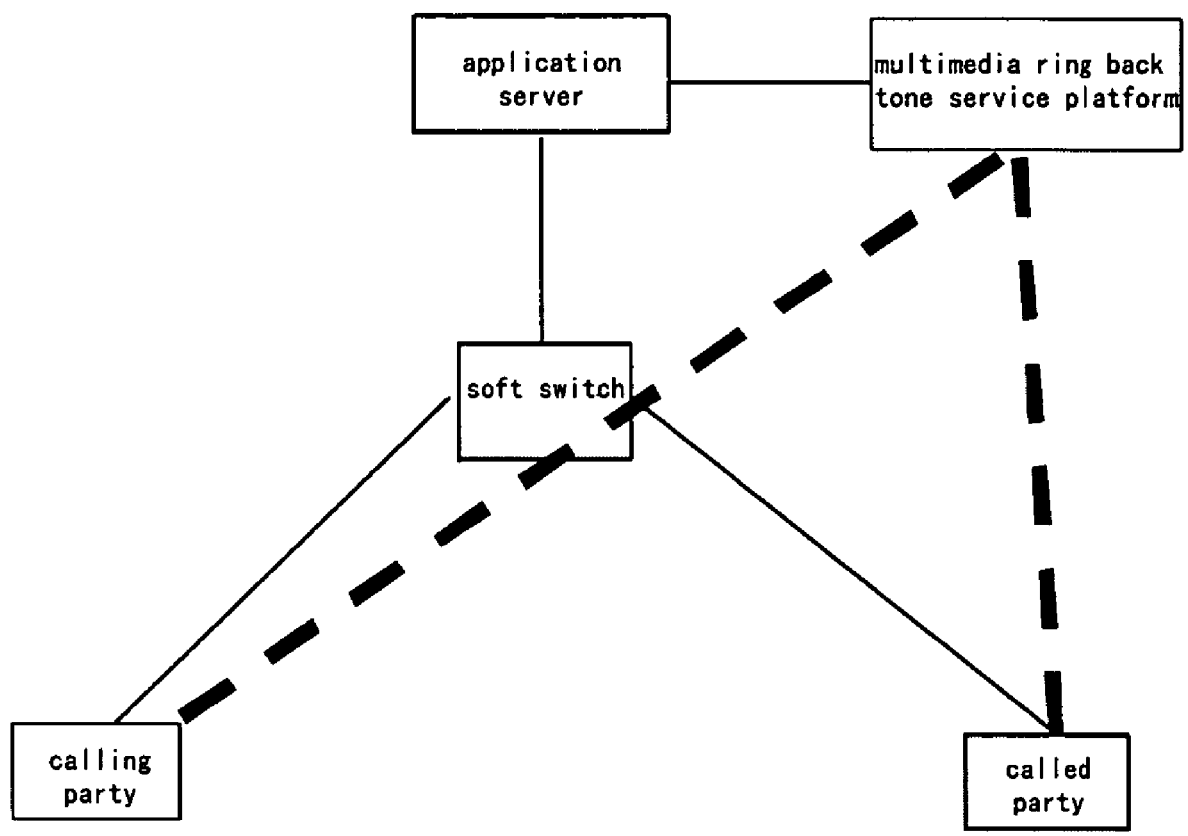
FIG. 3 is a schematic diagram showing the realization of the packet network multimedia ring back tone based on the NGN/3G.
Figure 4:
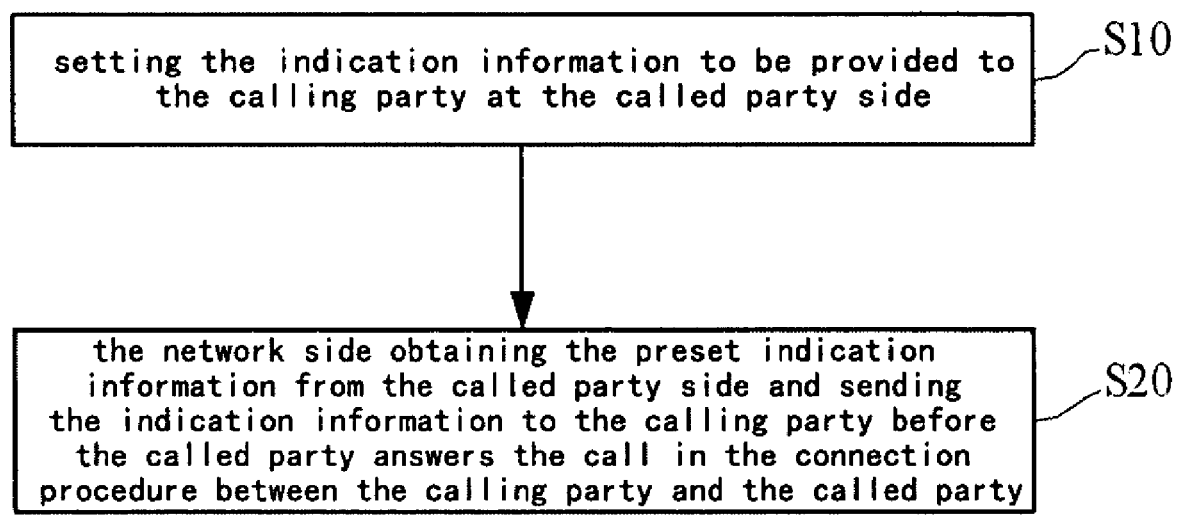
FIG. 4 is a flow chart showing the realization principle of the method for providing the indication information from the called party to the calling party according to a preferred embodiment of the present invention.

FIG. 4 is a flow chart showing the realization principle of the first method for providing the indication information from the called party to the calling party according to an embodiment of the present invention, the main realization procedure is as follows:

step S10: the indication information to be provided to the calling party is set at the called party. Perferably, the indication information is prestored in the user terminal which can be provided to the calling party when the calling party dials the called party and before the called party picks up the phone. The indication information to be provided to the calling party at the called party may be audio information (such as the ring back tone information) or video information (such as a piece of video inforamtion played to the calling party) or audio and video information or text information (such as a piece of greeting information sent to the calling party).

Step S20: the network side obtains the preset indication information from the called party and sends the indication information to the calling party before the called party answers the call in the connection procedure between the calling party and the called party.

Wherein, the network side obtains the current status information of the called party (including the idle status, in communication status and unable to be connected status, etc.) in the connection procedure between the calling party and the called party, and then obtains the preset indication information from the called party and sends the indication information to the calling party when the called party is idle.

The procedure of obtaining the preset indication information from the called party by the network side in step S20 specifically includes:

1). The network side prestores the identification of each called party which provides the indication information, wherein the identification of the called party includes but is not limited to the International Mobile Subscriber Identity (IMSI) of the callled party;

2). During the calling party calls the called party, the network side sends the request for obtaining the indication information to the corresponding called party according to the called party identification when determines the called party identification is among the called party identifications stored in step 1);

3). The called party sends the corresponding preset indication information to the network side, responding to the received request for obtaining the indication information.

The called party may provide different kinds of indication information for the calling party, for example providing a piece of music to the calling party A while providing a piece of video cartoon to the calling party B, which requires the called party to provide different kinds of indication information to different calling party and the specific realization process is as follows:

11) Different kinds of indication information may be preset for different calling party at the called party, and the mapping relation may be established between different kinds of indication information for different calling parties and the corresponding calling party identification respectively, wherein the identification of the calling party includes but is not limited to the International Mobile Subscriber Identity of the callling party;

12) the request for obtaining the indication information may be sent from the network side to the called party, and the request includes the calling party identification information;

13) the called party indexes the corresponding indication information according to the calling party identification in the received request for obtaining the indication information and the mapping relation between the indication information and the calling party identification, and then sends the indication information to the network side, so that it is realized that the called party provides different kinds of indication information to different calling parties.

Alternatively, when the called party receives a call from the calling party, it may select one piece of indication information from the indication information database in the terminal and send it to the network side. The specific processing procedure is as follows:

The called party presets an indication information list including at least one piece of the indication information to be provided to the calling party (wherein the content in the indication information list may be the name and property etc. of different indication information);

each time the called party receives the request for obtaining the indication information from the network side, it analyzes and displays the preset indication information list to the called party;

The called party selects a piece of indication information wish to be sent from the displayed indication information list;

the called party sends the indication information selected by the called party to the network side.

After the network side obtains the corresponding indication information from the called party, the terminal of the calling party may not support the indication information, so its media format should be transformed to the one that can be supported by the terminal of the calling party and then network side sends the transformed indication information to the calling party.

After step S20, if the network side finds the called party picks up the phone, it will stop sending the obtained indication information to the calling party and the calling party and the called party enters the normal communication process.

Figure 5:
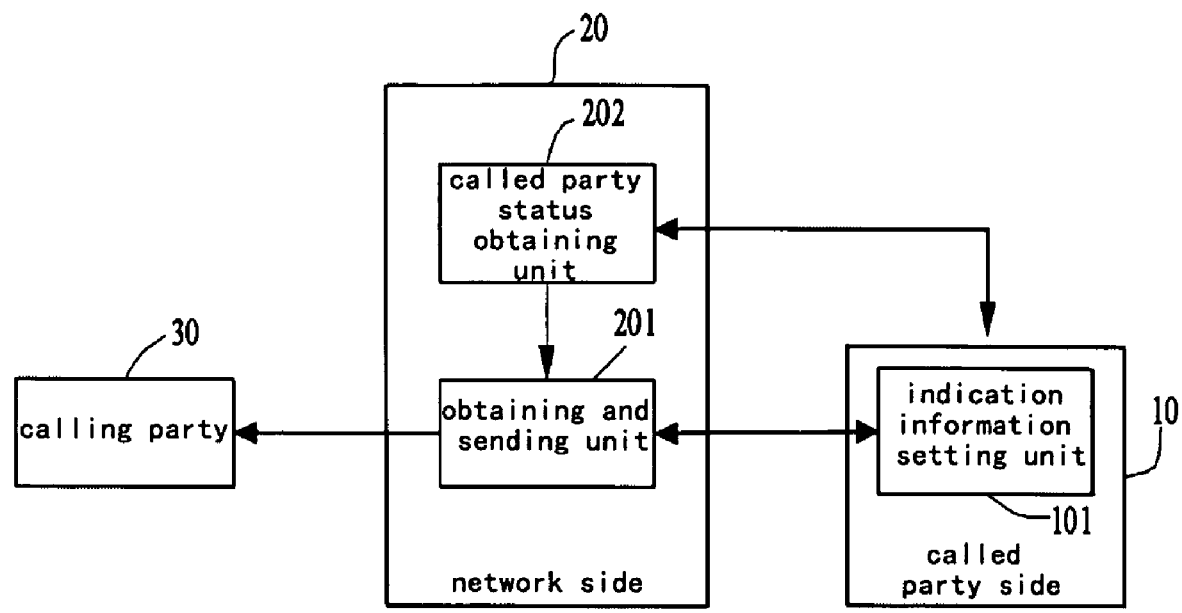
FIG. 5 is a block diagram showing the main architecture of the first system for providing the indication information from the called party to the calling party according to a preferred embodiment of the present invention.

Corresponding to the first method of an embodiment of the present invention, the present invention provides a system for a called party to provide the indication information to a calling party. FIG. 5 is a block diagram showing the main architecture of the first system for providing the indication information from the called party to the calling party according to an embodiment of the present invention and the main architecture includes: an indication information setting unit 101 at the called party 10, an obtaining and sending unit 201 at the network side 20, wherein:

the indication information setting unit 101 may be for setting the indication information to be provided to the calling party;

the obtaining and sending unit 201 may be for obtaining the set indication information from the indication information setting unit 101 at the called party 10 before the called party answers the call in the connection procedure between the calling party and the called party, and sending the indication information to the calling party 30;

wherein preferably the network side 20 further includes a called party status obtaining unit 202 for obtaining the status information of the called party 10 in the connection procedure between the calling party and the called party; the obtaining and sending unit 201 performs the obtaining of the indication information and the sending of the indication information to the calling party 10 when the called party status obtaining unit 202 obtains that the called party 10 is currently idle.

Figure 6:
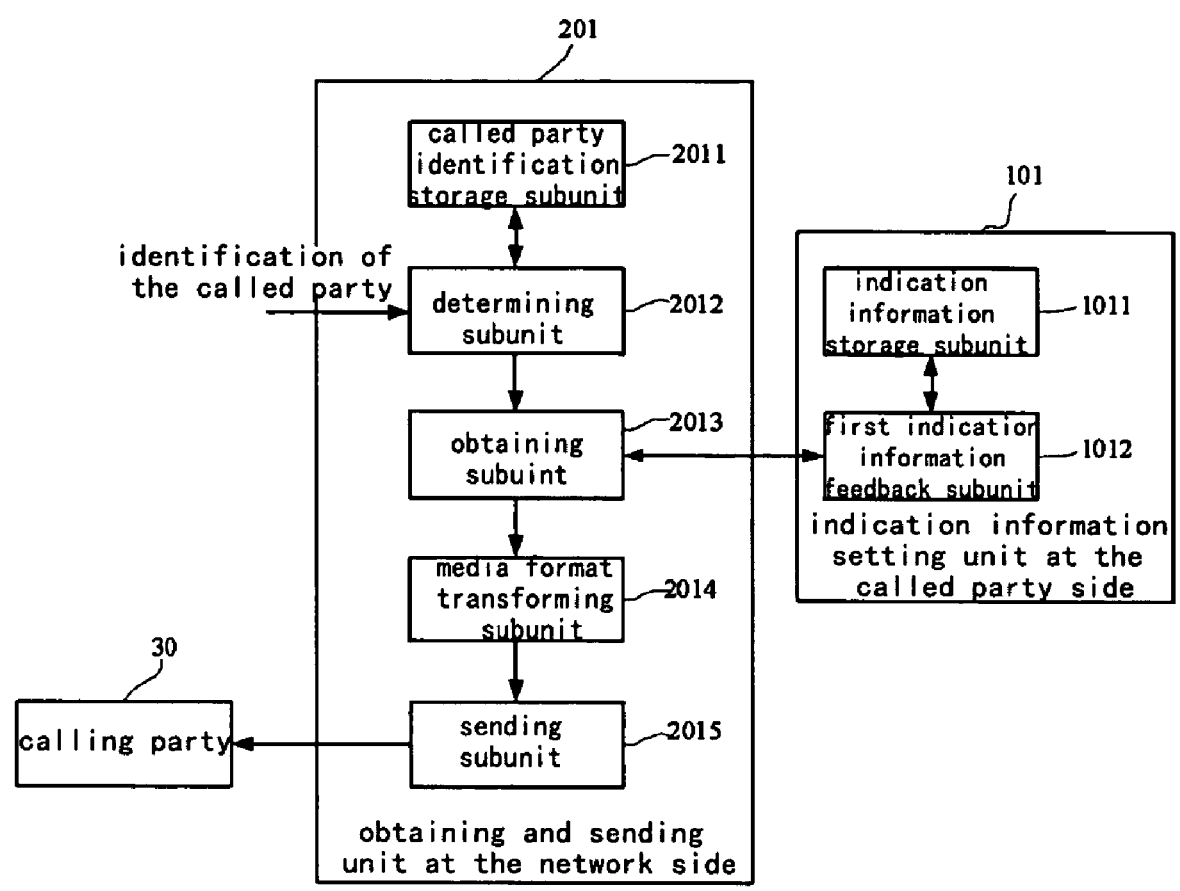
FIG. 6 is a block diagram showing the architectures of the indication information setting unit and the obtaining and sending unit in the first system according to a preferred embodiment of the present invention.

FIG. 6 is a block diagram showing the architectures of the indication information setting unit and the obtaining and sending unit in the first system according to the first embodiment of the present invention. Refer to FIG. 6, the obtaining and sending unit 201 specifically includes a called party identification storage subunit 2011, a determining subunit 2012, an obtaining subuint 2013, a media format transforming subunit 2014 and a sending subunit 2015; the indication information setting unit 101 specifically includes an indication information storage subunit 1011 and a first indication information feedback subunit 1012. The function of each subunit is as follows:

the indication information storage subunit 1011 may be for storing the indication information to be provided to the calling party 30 in advance;

the called party identification storage subunit 2011 may be for storing the identification of each called party which provides the indication information in advance;

the determining subunit 2012 may be for determining whether the called party identification is among the called party identifications stored in the called party identification storage subunit 2011;

the obtaining subuint 2014 may be for sending the request for obtaining the indication information to the corresponding called party according to the called party identification when the determining subunit 2012 determines the called party identification is among the called party identifications;

the first indication information feedback subunit 1012 may be for feeding back the indication information stored in the indication information storage subunit 1011 to the obtaining subunit 2013 when receives the request for obtaining the indication information from the obtaining subunit 2013;

the media format transforming subunit 2014 may be for transforming the media format of the indication information obtained by the obtaining subunit 2013 from the called party (wherein this unit is optional and when the media format of the indication information provided by the called party needn't be transformed, it is not necessary to set this unit);

the sending subunit 2015 may be for sending the indication information obtained by the obtaining subuint 2013 from the called party (or the indication information transformed by the media format transforming subunit 2014) to the calling party 30.

Figure 7:
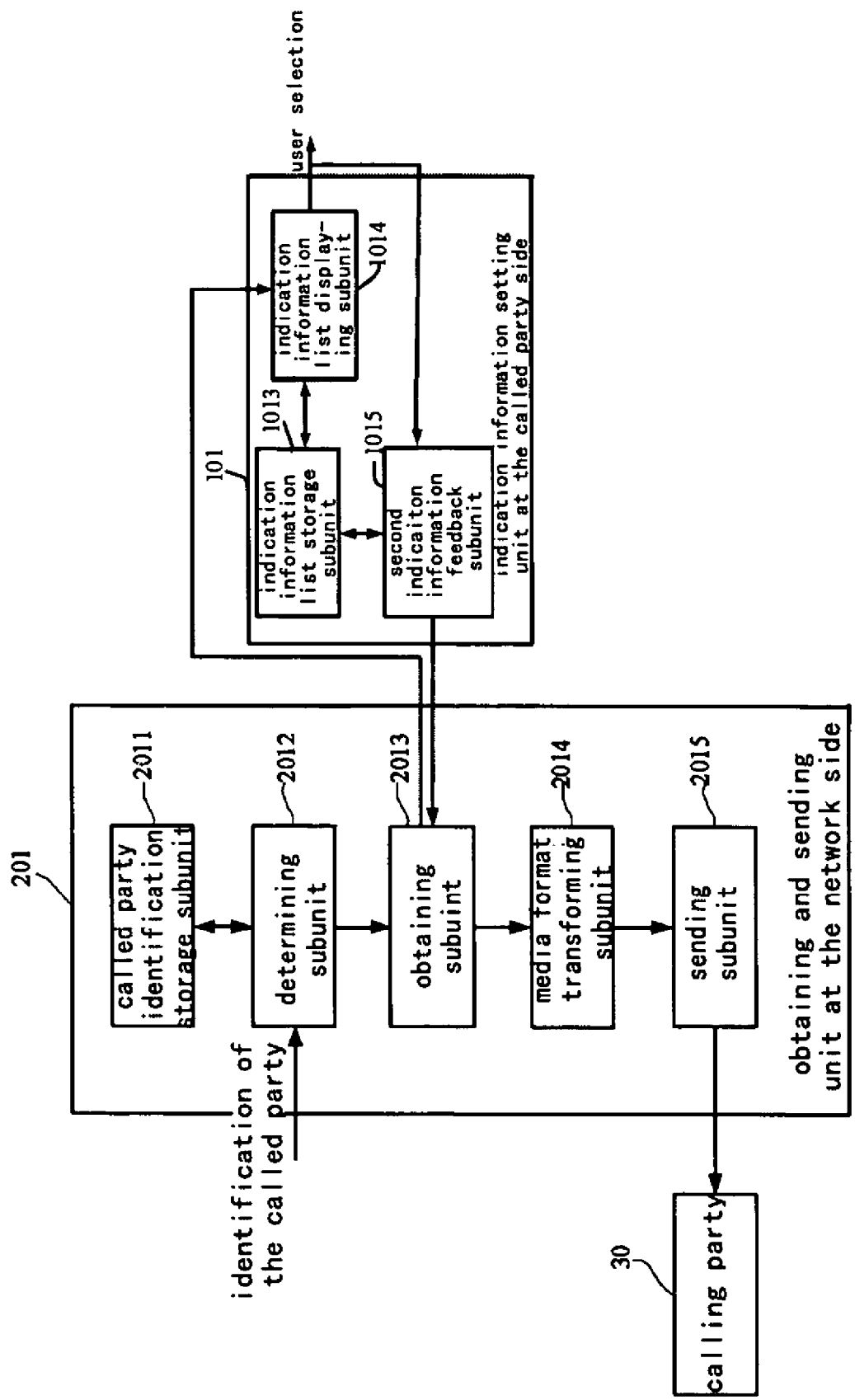
FIG. 7 is a block diagram showing the architectures of the indication information setting unit and the obtaining and sending unit in the first system according to a preferred embodiment of the present invention.

FIG. 7 is a block diagram showing the architectures of the indication information setting unit and the obtaining and sending unit in the first system according to the second embodiment of the present invention. Refer to FIG. 7, the obtaining and sending unit 201 specifically includes a called party identification storage subunit 2011, a determining subunit 2012, an obtaining subuint 2013, a media format transforming subunit 2014 and a sending subunit 2015; the indication information setting unit 101 specifically includes an indication information list storage subunit 1013, an indication information list displaying subunit 1014 and a second indicaiton information feedback subunit 1015. the function of each subunit is as follows:

the indication information list storage subunit 1013 may be for storing in advance an indication information list including at least one piece of the indication information to be provided to the calling party 30;

the called party identification storage subunit 2011 may be for storing the identification of each called party which provides the indication information in advance;

the determining subunit 2012 may be for determining whether the called party identification is among the called party identifications stored in the called party identification storage subunit 2011;

the obtaining subuint 2014 may be for sending the request for obtaining the indication information to the corresponding called party according to the called party identification when the determining subunit 2012 determines the called party identification is among the called party identifications;

the indication information list displaying subunit 1014 may be for displaying the indication information list stored in the indication information list storage subunit to the called party when receives the request for obtaining the indication information from the obtaining subunit 2013;

the second indicaiton information feedback subunit 1015 may be for feeding back the indication information selected by the called party in the indication information list to the obtaining subunit 2013;

the media format transforming subunit 2014 may be for transforming the media format of the indication information obtained by the obtaining subunit 2013 from the called party (wherein this unit is optional and when the media format of the indication information provided by the called party needn't be transformed, it is not necessary to set this unit);

the sending subunit 2015 may be for sending the indication information obtained by the obtaining subuint 2013 from the called party (or the indication information transformed by the media format transforming subunit 2014) to the calling party 30.

Figure 8:
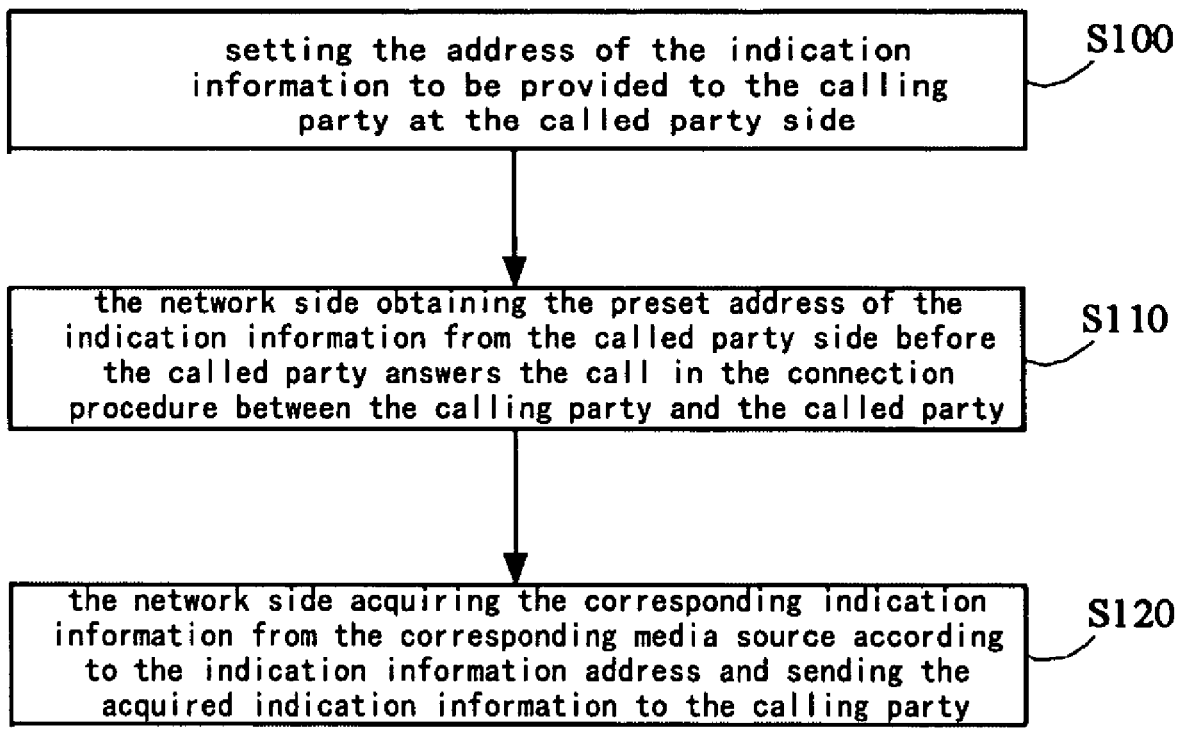
FIG. 8 is a flow chart showing the realization principle of the second method for providing the indication information from the called party to the calling party according to an embodiment of the present invention.

FIG. 8 is a flow chart showing the realization principle of the second method for providing the indication information from the called party to the calling party according to the present invention and the main realization procedure is as follows:

step S100: the address of the indication information to be provided to the calling party is set at the called party;

step S110: the network side obtains the preset address of the indication information from the called party before the called party answers the call in the connection procedure between the calling party and the called party.

step S120: the network side acquires the corresponding indication information from the corresponding media source according to the indication information address and sends the acquired indication information to the calling party, wherein the indication information is the audio information or video information, or audio and video information, or text information etc.

Wherein the network side obtains the current status information of the called party (including the idle status, in communication status and unable to be connected status, etc.) in the connection procedure between the calling party and the called party, and then performs the obtaining of the preset indication information in step S110 from the called party when the called party is idle.

Wherein the procedure of obtaining the preset address of the indication information from the called party by the network side in step S110 specifically includes:

1.1). the network side prestores the identification of each called party which provides the indication information, wherein the identification of the called party includes but is not limited to the International Mobile Subscriber Identity of the called party;

1.2). during the process when the calling party calls the called party, the network side sends the request for obtaining the address of the indication information to the corresponding called party according to the called party identification when determines the called party identification is among the called party identifications stored in step 1.1);

1.3). the called party sends the corresponding preset indication information to the network side responding to the received request for obtaining the address of the indication information.

wherein the called party can provide different kinds of indication information address for the calling party, for example providing the address of a piece of music to the calling party A while providing the address of a piece of video cartoon to the calling party B, which requires the called party to provide different kinds of indication information address to different calling party, and the specific realization process is as follows:

1.11) different kinds of indication information address for different calling party are preset at the called party; the mapping relation is established between different kinds of indication information address for different calling party and the corresponding calling party identification, wherein the identification of the calling party includes but is not limited to the International Mobile Subscriber Identity of the callling party;

1.12) the request for obtaining the address of the indication information sent from the network side to the called party includs the calling party identification information;

1.13) the called party indexes the corresponding the indication information address according to the calling party identification in the received request for obtaining the address of the indication information and the mapping relation between the indication information address and the calling party identification, and then sends the indication information address to the network side, so that the called party can provide different kinds of indication information address to different calling party.

wherein when the called party receives the call from the calling party, it selects one indication information address from the indication information address database in the terminal and sends it to the network side; the specific processing procedure is as follows:

it is preset an indication information address list including at least one indication information address to be provided to the calling party at the called party, every time the called party receives the request for obtaining the address of the indication information from the network side, it analyzes and displays the preset indication information address list to the called party;

the called party selects one preferred indication information address from the displayed indication information address list;

and, the called party sends the indication information address selected by the called party to the network side.

Wherein after the network side obtains the corresponding indication information address from the called party and aquires the corresponding indication information, the terminal of the calling party may not support the indication information so its media format should be transformed to the one that may be supported by the terminal of the calling party and then network side sends the transformed indication information to the calling party.

After step S120, if the network side finds the called party picks up the phone, it will stop sending the acquired indication information from the media source to the calling party, and the calling party and the called party enter the normal communication process.

Figure 9:
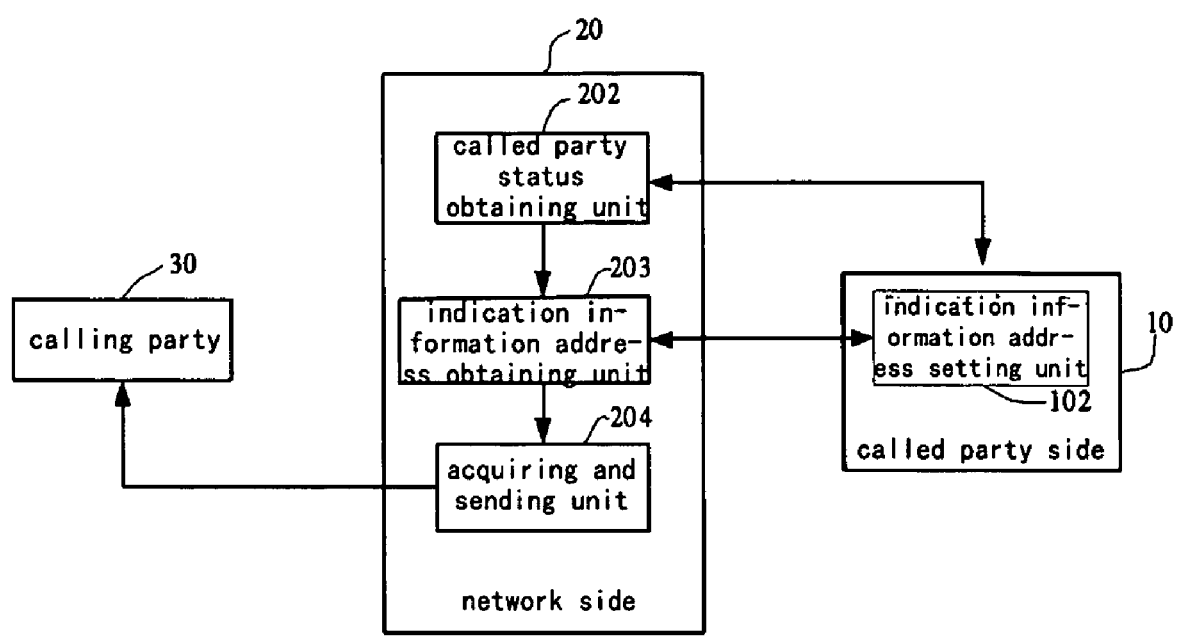
FIG. 9 is a block diagram showing the main architecture of the second system for providing the indication information from the called party to the calling party according to an embodiment of the present invention.

Corresponding to the second method of the present invention, the present invention provides a system for a called party to provide the indication information to a calling party. FIG. 9 is a block diagram showing the main architecture of the second system for providing the indication information from the called party to the calling party according to an embodiment of the present invention and the main architecture includes: an indication information address setting unit 102 at the called party 10, an indication information address obtaining unit 203 and an acquiring and sending unit 201 at the network side 20, wherein:

the indication information address setting unit 102 may be for setting the address of the indication information to be provided to the calling party;

the indication information address obtaining unit 203 may be for obtaining the address of the preset indication information from the indication information address unit 102 at the called party 10 before the called party answers the call in the connection procedure between the calling party and the called party;

the acquiring and sending unit 204 may be for acquiring the corresponding indication information from the corresponding media source according to the address of the indication information obtained by the indication information address obtaining unit 203 and sending the indication information to the calling party 30.

Preferably, the network side 20 further includes a called party status obtaining unit 202 for obtaining the called party status information in the connection procedure between the calling party and the called party; the indication information address obtaining unit 203 performs the obtaining of the address of the indication information when the called party status obtaining unit 202 obtains that the called party 10 is currently idle.

Figure 10:
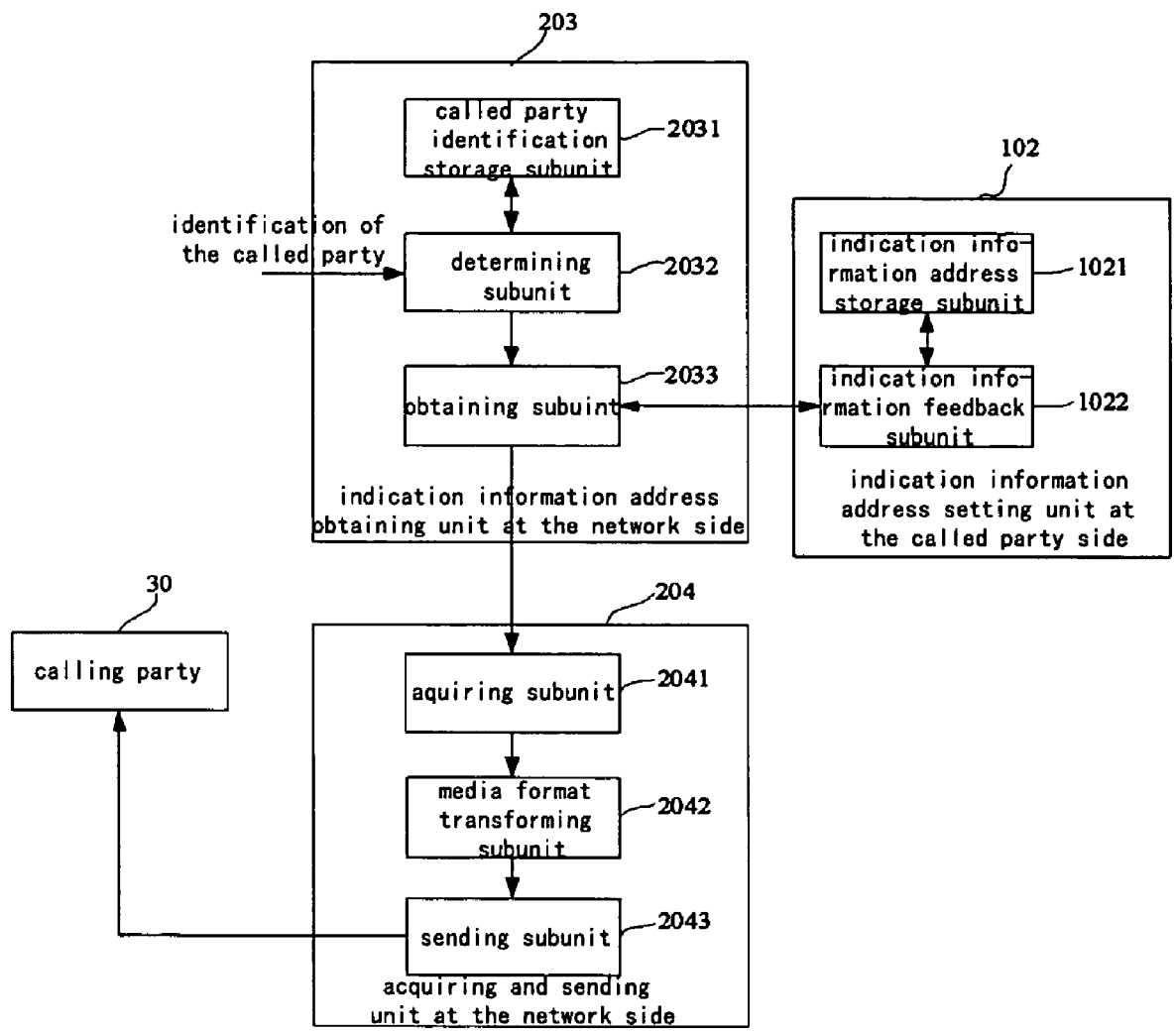
FIG. 10 is a block diagram showing the architectures of the indication information address setting unit, the indication information address obtaining unit and the acquiring and sending unit in the second system according to an embodiment of the present invention.

FIG. 10 is a block diagram showing the architectures of the indication information address setting unit, the indication information address obtaining unit and the acquiring and sending unit in the second system according to an embodiment of the present invention, wherein the the indication information setting unit 102 specifically includes an indication information address storage subunit 1021, an indication information feedback subunit 1022; the indication information address obtaining unit 203 specifically includes a called party identification storage subunit 2031, a determining subunit 2032 and an obtaining subuint 2033; the acquiring and sending unit 204 specifically includes an aquiring subunit 2041, a media format transforming subunit 2042 and a sending subunit 2043; wherein the function of each subunit is as follows:

the indication information address storage subunit 1021 may be for storing the address of the indication information to be provided to the calling party 30 in advance;

the called party identification storage subunit 2031 may be for storing the identification of each called party which provides the address of the indication information in advance;

the determining subunit 2032 may be for determining whether the called party identification is among the called party identifications stored in the called party identification storage subunit 2031;

the obtaining subuint 2033 may be for sending the request for obtaining the address of the indication information to the corresponding called party according to the called party identification when the determining subunit 2032 determines the called party identification is among the called party identifications;

the indication information feedback subunit 1022 may be for feeding back the address of the indication information stored in the indication information address storage subunit 1021 to the obtaining subunit 2033 when receives the request for obtaining the address of the indication information from the obtaining subunit 2033;

the aquiring subunit 2041 may be for acquiring the corresponding indication information from the corresponding media source according to the address of the indication information obtained by the indication information address obtaining unit 2033;

the media format transforming subunit 2042 may be for transforming the media format of the indication information acquired by the obtaining subunit 2041 from the media source (wherein this unit is optional and when the media format of the indication information provided by the called party needn't be transformed, it is not necessary to set this unit);

the sending subunit 2043 may be for sending the indication information acquired by the obtaining subunit 2041 from the media source (or the indication information transformed by the media format transforming subunit 2042) to the calling party 30.

Wherein in the practical application of the present invention, before the user may use the service of selecting the indication information to be provided to the calling party, he or she should subscribe the service from the operator, i.e. notify the network side that he or she will provide the calling party with the incidation information selected when being called. This new service in the present invention is named "called party informaiton indication service".

Figure 11:
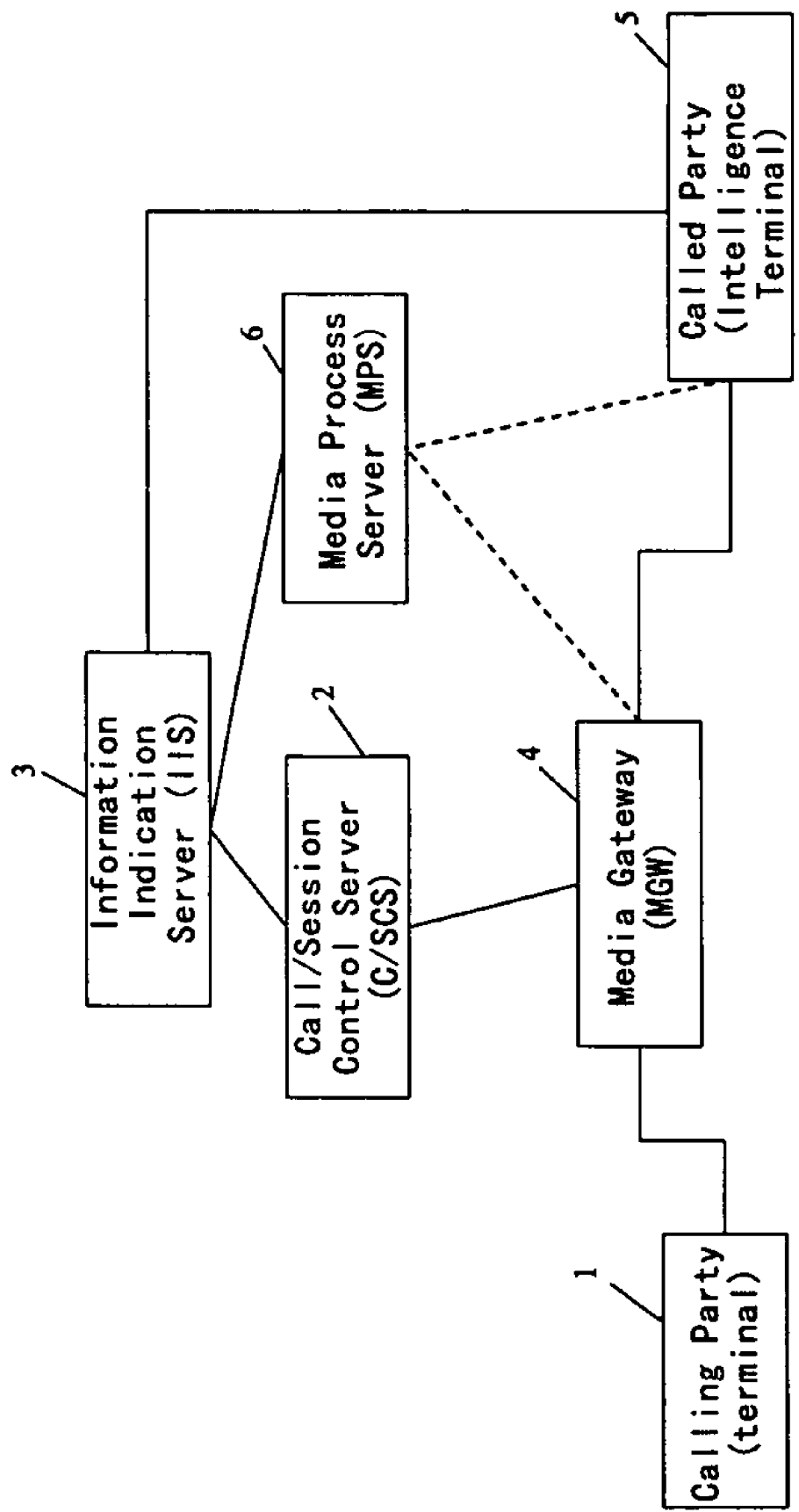
FIG. 11 is a block diagram of an embodiment showing the relations of function entities in the NGN network when the present solution is applied in the NGN network.

FIG. 11 is a block diagram showing the relations of function entities in the NGN network when the present solution is applied in the NGN network. Although only the implementation of the present invention in the NGN network is described here, it may be the same in the mobile soft switch network, 3G network, Internet or GPRS network. The relations of function entities in the NGN network are as follows:

an Information Indication Server (IIS) 3 may be for processing the called party information indication service;

a Media Process Server (MPS) 6 may be for processing the indication information to be media transformed which may be sent from the called party;

an Called Party Intelligence Terminal 5 may be for sending the indication information to be sent from the called party to the calling party through the network, wherein the calling party may be a normal terminal and an intelligent terminal;

a Call/Session Control Server (C/SCS) 2 may be for establishing the connection procedure between the calling party and the called party, for triggering the called party information indication service according to the called party information indication service triggering standard and for sending the indication information to the IIS 3 to be processed;

a Media Gateway (MGW) 4 may be for transforming the core network information into the general information acceptable to the calling party or the called party according to the type of the access network.

In some cases, the MGW 4 and the MPS 6 may be the same function entity.

The obtaining and sending unit in the system according to the present invention by which the called party provides the indication information to the calling party may be in the MPS and the MGW, the called party status obtaining unit may be in the C/SCS, and the indication information address obtaining unit may be in the IIS. The implementation of the present invention has the following four cases:

1. calling party terminal T-> called party terminal IT, wherein the called party provides the indication information content whose media format doesn't need to be transformed;

2. calling party terminal T-> called party terminal IT, wherein the called party provides the address of the stored indication information and the media format of the indication information doesn't need to be transformed;

3. calling party terminal T-> called party terminal IT, wherein the called party provides the indication information content whose media format needs to be transformed;

4. calling party terminal T-> called party terminal IT, wherein the called party provides the address of the stored indication information and the media format of the indication information needs to be transformed;

The implementation processing procedures for the above four cases will be described in detail:

The Application Scene of the Embodiment 1

Supposing the calling party is A and the called party is B; the called party terminal provides the indication information content whose media format doesn't need to be transformed and directly sends the indication information to the calling party A through the network; supposing the calling party A and the called party B belong to the same network for the purpose of simplicity.

Figure 12:
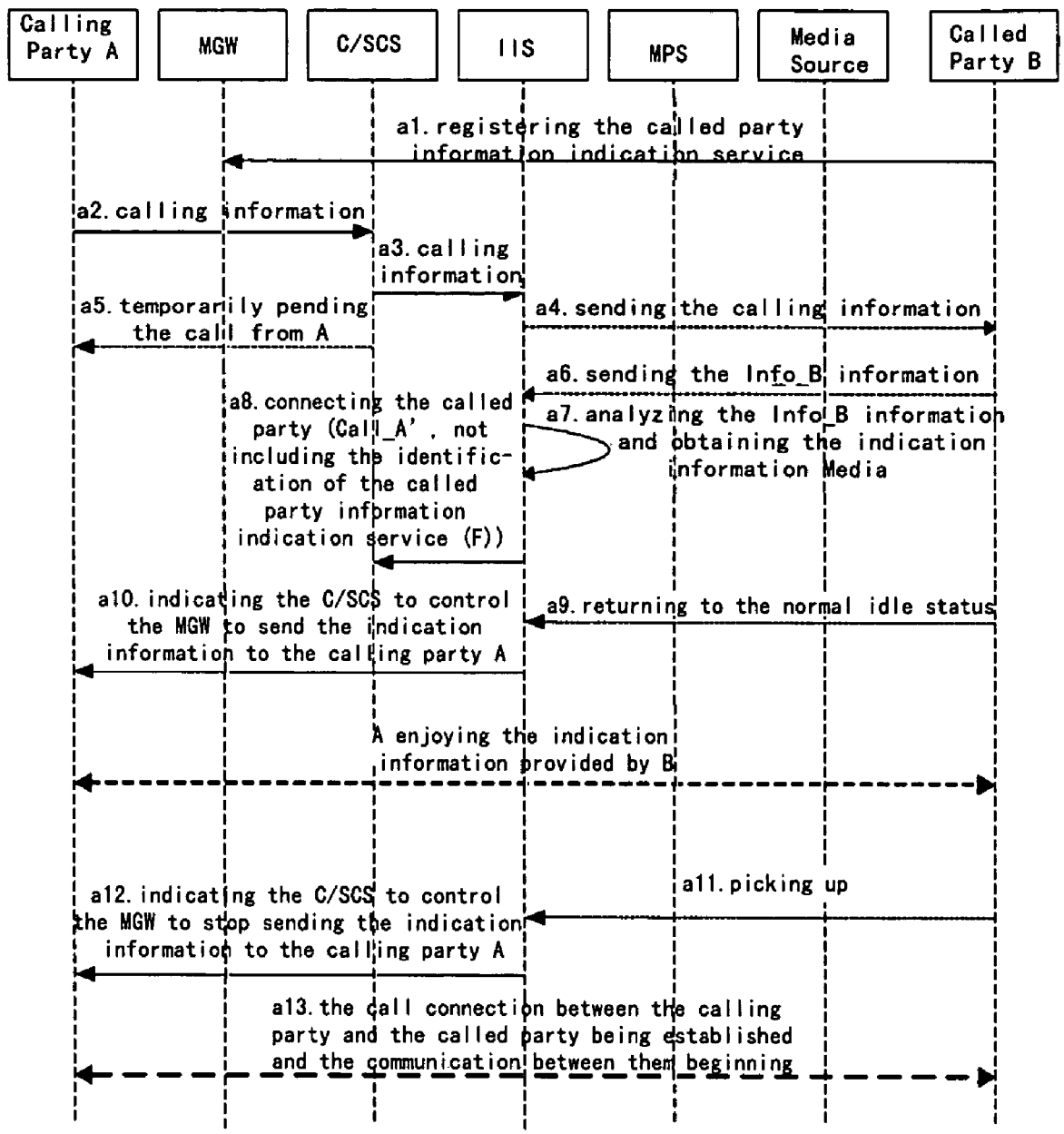
FIG. 12 is a scheme diagram showing the processing procedure of the first embodiment of the present invention.

FIG. 12 is a scheme diagram showing the processing procedure of the first embodiment of the present invention, and the main processing procedure is as follows:

a1: the called party B registers the called party information indication service at the network side in advance, so that the network side knows the called party B will provide the corresponding indication information to the calling party for all the calls destined to the called party B;

a2: when the calling party A calls the called party B, the calling information is transmitted to the C/SCS 2 through the MGW 4;

a3: the C/SCS 2 sends the calling information to the corresponding IIS3, and indicates in the calling information that the call is the one with the called party information indication service;

a4: when the IIS3 inquires the database according to the received calling information and finds the called party B has subscribed the called party information indication service, it transfers the calling information to the called party B, wherein the calling information includes the information of the calling party A (Call ID_A) such as the number of the calling party etc. and the identification of the called party information indication service (F); wherein the IIS3 may interact with the called party B in the following two manners:

1). the IIS 3 sends the calling information to the called party B through the normal call connection signaling, i.e. the IIS 3 accesses the called party B through controlling the C/SCS 2 so as to send the calling information to the called party B through the C/SCS 2;

2). the IIS 3 sends the calling information to the called party B through the self-defined interface between itself and the called party B;

a5: the IIS 3 controls the C/SCS 2 to temporarily pending the call from the calling party A; or intercepts the default called party indication information in the network through directly intercepting the signaling;

a6: the terminal of the called party B determines whether to send the corresponding preset indication property information (Info_B) to the calling party A according to the identification of the called party information indication service (F) in the received calling information;

wherein terminal of the called party B may determine the corresponding preset indication property information (Info_B) according to the information (Call ID_A) of the calling party A included in the received calling information; or when the called party receives the calling information, it will show each piece of the indication property information to the called party in its indication property information database and the called party selects the corresponding preset indication property information (Info_B);

wherein the called party B sends the determined indication property information (Info_B) to the IIS 3; wherein the called party B may interact with the IIS 3 in the following two manners:

1) the called party B sends the determined indication property information (Info_B) to the IIS 3 through the normal call connection signaling, i.e. the called party B sends the determined indication property information (Info_B) to the IIS 3 through the C/SCS 2;

2). the called party B sends the determined indication property information (Info_B) to the IIS 3 through the self-defined interface between itself and the called party B;

wherein, in order to improve the connecting efficiency, the obtaining of the corresponding indication information of the called party in the subsequent processing procedures may be performed after the status of the called party is known; for example, the corresponding indication information may be obtained when the called party is actually connected and the called party office returns the status of the called party is idle;

a7: when the IIS 3 receives the indication property information (Info_B) sent from the called party, it analyzes the indication property information (Info_B) and obtains the media description information (Media_B) of the actual indication information, wherein Media_B indicates the actual media content source information: the indication information provided by the called party B or the address of the indication information provided by the called party B; in the present embodiment, the IIS3 determines whether Media_B is the indication information provided by the called party B;

a8: the IIS 3 controls the C/SCS 2 to send the calling information to the called party B, wherein this calling information only carries the information of the calling party A (Call ID_A), but not the identification of the called party information indication service (F);

a9: when the status of the called party B is idle, the called party B feeds back that it is in the idle status to the IIS 3;

a10: when the IIS 3 obtains the called party B is in the idle status, it indicates the C/SCS 2 to control the MGW 4 to send the indication information provided by the called party B to the calling party A (i.e. during the connection procedure between the calling party and the called party and before the called party B answers the call, the MGW 4 will send the indication information obtained from the called party B to the calling party A);

a11: the called party B picks up the phone and the called party office sends the picking up signal to the IIS 3;

a12: after the IIS 3 receives the picking up signal, it indicates the C/SCS 2 to control the MGW 4 to stop sending the indication information provided by the called party B to the calling party A;

a13: the call connection between the calling party and the called party is established and the communication between them begins.

The Application Scene of the Embodiment 2

Supposing the calling party is A and the called party is B; the called party terminal provides the address of the indication information, wherein the media format of the indication information doesn't need to be transformed, and directly sends the indication information to the calling party A through the network; supposing the calling party A and the called party B belong to the same network for the purpose of simplicity.

Figure 13:
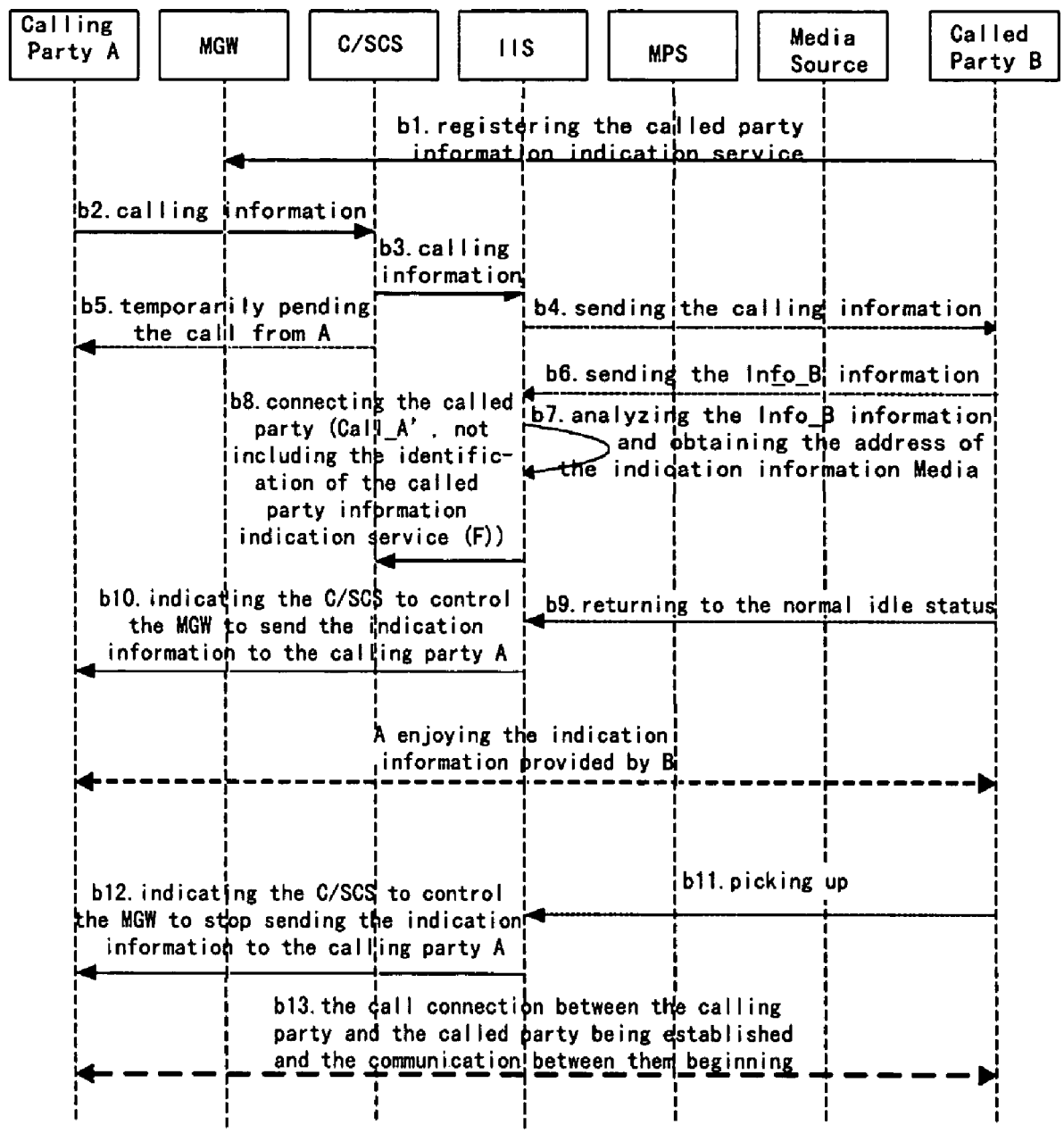
FIG. 13 is a scheme diagram showing the processing procedure of the second embodiment of the present invention.

FIG. 13 is a scheme diagram showing the processing procedure of the second embodiment of the present invention, and the main processing procedure is as follows:

Step b1~b6 are the same with a1~a6 in the above first embodiment;

b7: after the IIS 3 receives the indication property information (Info_B) sent from the called party, it analyzes the indication property information (Info_B) and obtains the media description information (Media_B) of the actual indication information, wherein Media_B indicates the actual media content source information: the indication information provided by the called party B or the address of the indication information provided by the called party B; in the present embodiment, the IIS3 determines whether Media_B is the address of the indication information provided by the called party B;

Step b8~b9 are the same with a8~a9 in the above first embodiment;

b10: when the IIS 3 obtains the called party B is in the idle status, it indicates the C/SCS 2 to control the MGW 4 to send the address of the indication information provided by the called party B to the calling party A and to obtain the corresponding indication information from the corresponding media source and to send the obtained indication information to the calling party A (i.e. during the connection procedure between the calling party and the called party and before the called party B answers the call, the MGW 4 will send the indication information obtained from the corresponding media source according to the address of the indication information provided by the called party B to the calling party A);

Step b11~b13 are the same with a11~a13 in the above first embodiment.

The Application Scene of the Embodiment 3

Supposing the calling party is A and the called party is B; the called party terminal provides the indication information content, wherein the media format of the indication information needs to be transformed, and directly sends the indication information to the calling party A through the network; supposing the calling party A and the called party B belong to the same network for the purpose of simplicity.

Figure 14:
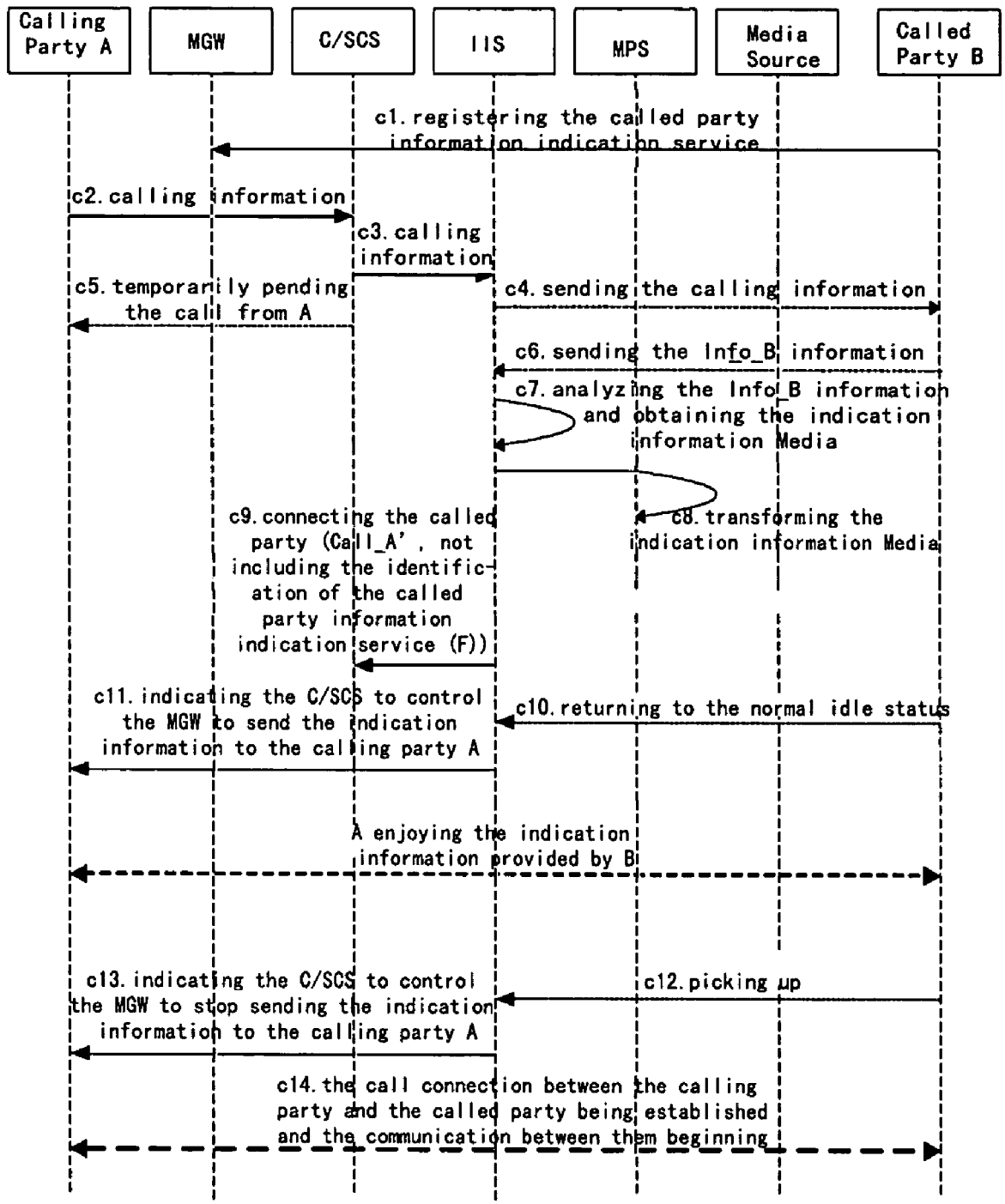
FIG. 14 is a scheme diagram showing the processing procedure of the third embodiment of the present invention.

FIG. 14 is a scheme diagram showing the processing procedure of the third embodiment of the present invention, and the main processing procedure is as follows:

Step c1~c7 are the same with a1~a7 in the above first embodiment;

c8: the IIS 3 sends the obtained media description information (Media_B) of the indication information to the MPS 6 and the MPS 6 transforms the media description information (Media_B) of the obtained indication information;

Step c9~c10 are the same with a8~a9 in the above first embodiment;

c11: when the IIS 3 obtains the called party B is in the idle status, it indicates the C/SCS 2 to control the MGW 4 to send the indication information transformed by the MPS 6 to the calling party A (i.e. during the connection procedure between the calling party and the called party and before the called party B answers the call, the MGW 4 will send the indication information transformed by the MPS 6 to the calling party A);

Step c12~c14 are the same with a11~a13 in the above first embodiment.

The Application Scene of the Embodiment 4

Suppose the calling party is A and the called party is B; the called party terminal provides the address of the indication information, wherein the media format of the indication information needs to be transformed, and directly sends the indication information to the calling party A through the network; supposing the calling party A and the called party B belong to the same network for the purpose of simplicity.

Figure 15:
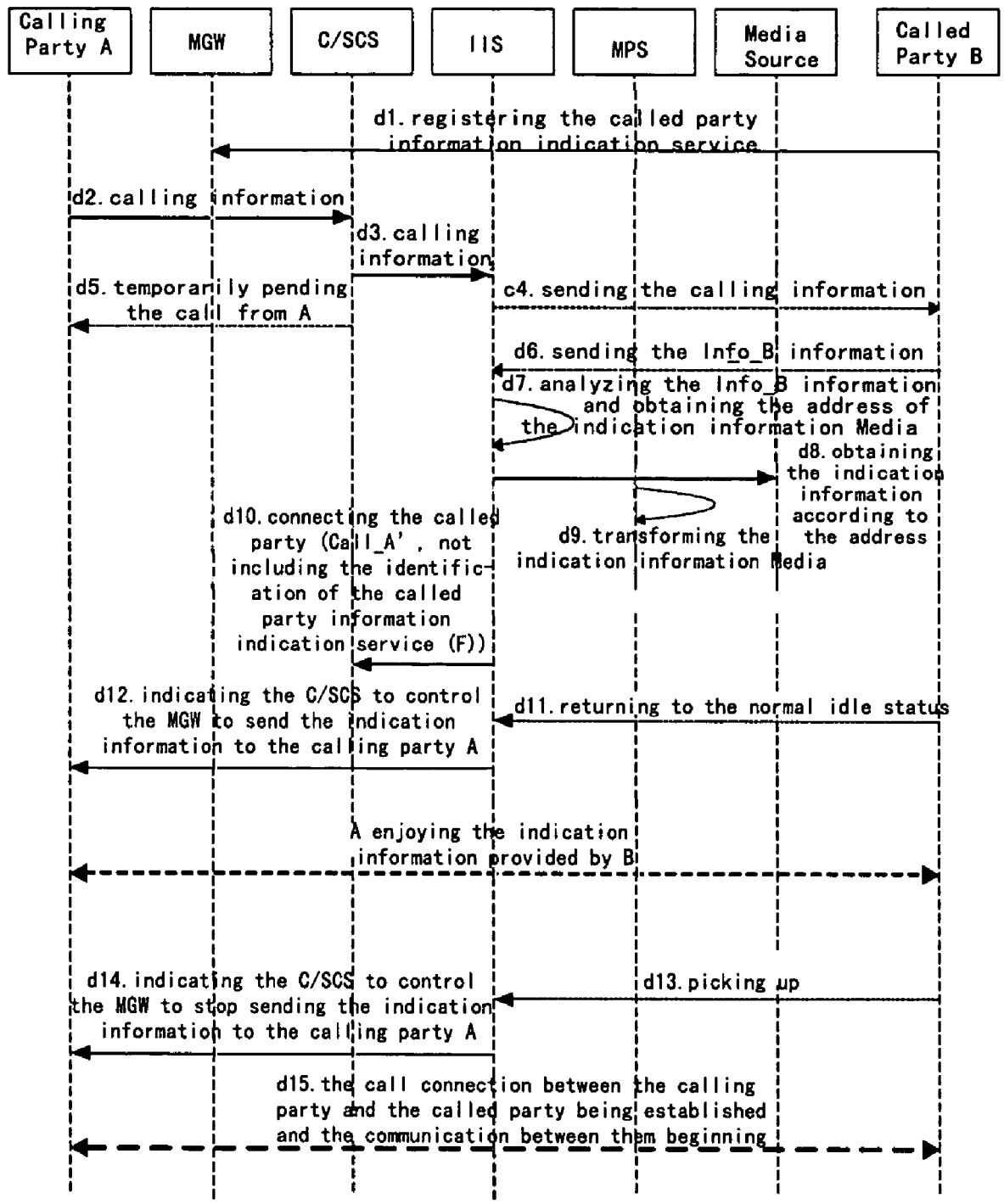
FIG. 15 is a scheme diagram showing the processing procedure of the fourth embodiment of the present invention.

FIG. 15 is a scheme diagram showing the processing procedure of the fourth embodiment of the present invention, and the main processing procedure is as follows:

Step d1~d6 are the same with a1~a6 in the above first embodiment;

d7: after the IIS 3 receives the indication property information (Info_B) sent from the called party, it analyzes the indication property information (Info_B) and obtains the media description information (Media_B) of the actual indication information, wherein Media_B indicates the actual media content source information: the indication information provided by the called party B or the address of the indication information provided by the called party B; in the present embodiment, the IIS3 determines whether Media_B is the address of the indication information provided by the called party B;

d8: the IIS3 indicates the MPS 6 to obtain the corresponding indication information from the corresponding media source according to the obtained address of the indication information provided by the called party B;

d9: the MPS 6 transforms the media format of the obtained indication information;

Step d10~cd11 are the same with a8~a9 in the above first embodiment;

d12: when the IIS 3 obtains the called party B is in the idle status, it indicates the C/SCS 2 to control the MGW 4 to send the indication information transformed by the MPS 6 to the calling party A (i.e. during the connection procedure between the calling party and the called party and before the called party B answers the call, the MGW 4 will send the indication information transformed by the MPS 6 to the calling party A);

Step d13~d15 are the same with a11~a13 in the above first embodiment.

The present invention makes it possible that the called party can flexibly set the indication inforamtion and doesn't need to set the needed indication information at the network side, which allows the user to freely select the indication information in some extent and allows the operator to maintain the control function on the service.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A method for a called party of a communication system to provide indication information of the called party to a calling party, comprising:
   presetting an address of the indication information at the called party, wherein the address of the indication information is stored in a user terminal of the called party;
   obtaining, by a network side, the address of the preset indication information from the called party, before the called party answers the call in the connection procedure between the calling party and the called party; and
   acquiring the indication information from a corresponding media source according to the obtained address of the indication information, and sending the acquired indication information to the calling party.

2. The method according to claim 1, further comprising:
   obtaining, by the network side, a current status information of the called party in the connection procedure between the calling party and the called party;
   if the called party is idle, obtaining the address of the preset indication information from the called party.

3. The method according to claim 1, wherein obtaining the address of the indication information from the called party comprises:
   storing, by the network side, the identification of the called party which provides the address of the indication information;
   sending, by the network side, a request for obtaining the address of the indication information to the corresponding called party according to the called party identification when determining that the called party identification is among the stored called party identifications; and
   sending, by the called party, the address of the indication information to the network side according to the received request for obtaining the address of the indication information.

4. The method according to claim 1, wherein before the network side sends the indication information to the calling party, the method further comprises:
   transforming the media format of the indication information by the network side.

5. A communication system for a called party to provide indication information of the called party to a calling party, comprising:
   a user terminal of the called party and a network side; wherein
   the user terminal of the called party is configured to preset an address of the indication information to be provided to the calling party, wherein the address of the indication information is stored in the user terminal of the called party;
   the network side is configured to obtain the address of the indication information from the called party before the called party answers the call in the connection procedure between the calling party and the called party;
   and obtain the indication information from a corresponding media source according to the obtained address of the indication information and send the indication information to the calling party.

6. The system according to claim 5, wherein the network side is further configured to obtain the called party status information in the connection procedure between the calling party and the called party; and obtain the address of the indication information from the called party if the called party is idle.

7. The system according to claim 5, wherein the network side is further configured to
   prestore the identification of the called party which provides the address of the indication information; and
   send a request for obtaining the address of the indication information to the corresponding called party according to the called party identification when determining that the called party identification is among the stored called party identifications;
   and send the address of the indication information obtained at the called party to the calling party.

8. The system according to claim 5, wherein the network side is further configured to transform the media format of the obtained indication information, and send the transformed indication information to the calling party.

9. A communication device for providing indication information, comprising:
   an indication information setting unit, configured to set an address of the indication information to be provided to a user terminal which calls the communication device, wherein the indication information setting unit comprises an indication information address storage subunit and an indication information feedback subunit;
   the indication information address storage subunit, configured to store the address of the indication information in advance;
   the indication information feedback subunit, configured to feed back the address of the indication information stored in the indication information address storage subunit to a network side when receiving a request for obtaining the address of the indication information from the network side before the communication device answers the call in the connection procedure between the communication device and the user terminal.

* * * * *

UNITED STATES PATENT AND TRADEMARK OFFICE
CERTIFICATE OF CORRECTION

| | | |
|---|---|---|
| PATENT NO. | : 7,974,403 B2 | Page 1 of 1 |
| APPLICATION NO. | : 11/505108 | |
| DATED | : July 5, 2011 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this
Twenty-second Day of November, 2011

David J. Kappos
*Director of the United States Patent and Trademark Office*

UNITED STATES PATENT AND TRADEMARK OFFICE
CERTIFICATE OF CORRECTION

PATENT NO. : 7,974,403 B2  
APPLICATION NO. : 11/505108  
DATED : July 5, 2011  
INVENTOR(S) : Jun Wang et al.

Page 1 of 1

It is certified that error appears in the above-identified patent and that said Letters Patent is hereby corrected as shown below:

IN THE SPECIFICATIONS:

Column 3, line 44, delete "obtainins" and insert -- obtaining --.
Column 3, line 45, delete "indcation" and insert -- indication --.
Column 5, line 34, "delete "callling" and insert -- calling --.
Column 6, line 42, delete "subuint" and insert -- subunit --.
Column 6, line 58, delete "subuint" and insert -- subunit --.
Column 7, line 8, delete "subuint" and insert -- subunit --.
Column 7, line 18, delete "subuint" and insert -- subunit --.
Column 7, line 36, delete "subuint" and insert -- subunit --.
Column 7, line 57, delete "subuint" and insert -- subunit --.
Column 8, line 53, delete "callling" and insert -- calling --.
Column 8, line 56, delete "includs" and insert -- includes --.
Column 10, line 6, delete "subuint" and insert -- subunit --.
Column 10, line 22, delete "subuint" and insert -- subunit --.
Column 10, line 56, delete "incidation" and insert -- indication --.
Column 10, line 58, delete "informaiton" and insert -- information --.
Column 14, line 59, delete "d10-cd11" and insert -- d10-d11 --.
Column 15, line 4, delete "inforamtion" and insert -- information --.

Signed and Sealed this  
Third Day of January, 2012

David J. Kappos  
*Director of the United States Patent and Trademark Office*